(No Model.) 5 Sheets—Sheet 1.
E. G. BEEBE.
SUGAR CANE CUTTERS, STRIPPERS, AND HEADERS.
No. 268,381. Patented Dec. 5, 1882.

WITNESSES

INVENTOR (No Model.)    E. G. BEEBE.    5 Sheets—Sheet 3.
SUGAR CANE CUTTERS, STRIPPERS, AND HEADERS.
No. 268,381.    Patented Dec. 5, 1882.

WITNESSES    INVENTOR (No Model.) 5 Sheets—Sheet 4.
E. G. BEEBE.
SUGAR CANE CUTTERS, STRIPPERS, AND HEADERS.
No. 268,381. Patented Dec. 5, 1882.

WITNESSES
INVENTOR (No Model.)   5 Sheets—Sheet 5.

E. G. BEEBE.
SUGAR CANE CUTTERS, STRIPPERS, AND HEADERS.

No. 268,381. Patented Dec. 5, 1882.

WITNESSES
INVENTOR

UNITED STATES PATENT OFFICE.

EDGAR G. BEEBE, OF WIOTA, WISCONSIN.

SUGAR-CANE CUTTER, STRIPPER, AND HEADER.

SPECIFICATION forming part of Letters Patent No. 268,381, dated December 5, 1882.

Application filed September 9, 1882. (No model.)

*To all whom it may concern:*

Be it known that I, EDGAR G. BEEBE, of Wiota, in the county of La Fayette and State of Wisconsin, have invented certain new and useful Improvements in Sugar-Cane Cutters, Strippers, and Headers; and I do hereby declare that the following is a full, clear, and exact description of the invention, which will enable others skilled in the art to which it appertains to make and use the same, reference being had to the accompanying drawings, which form a part of this specification.

This invention relates to sugar-cane cutters, strippers, and headers, and has for its object to provide a convenient and efficient machine that will cut the stalks, strip the head of leaves or seed, cut off the head, and deposit both stalks and heads in regular piles on the ground.

Figure 1:
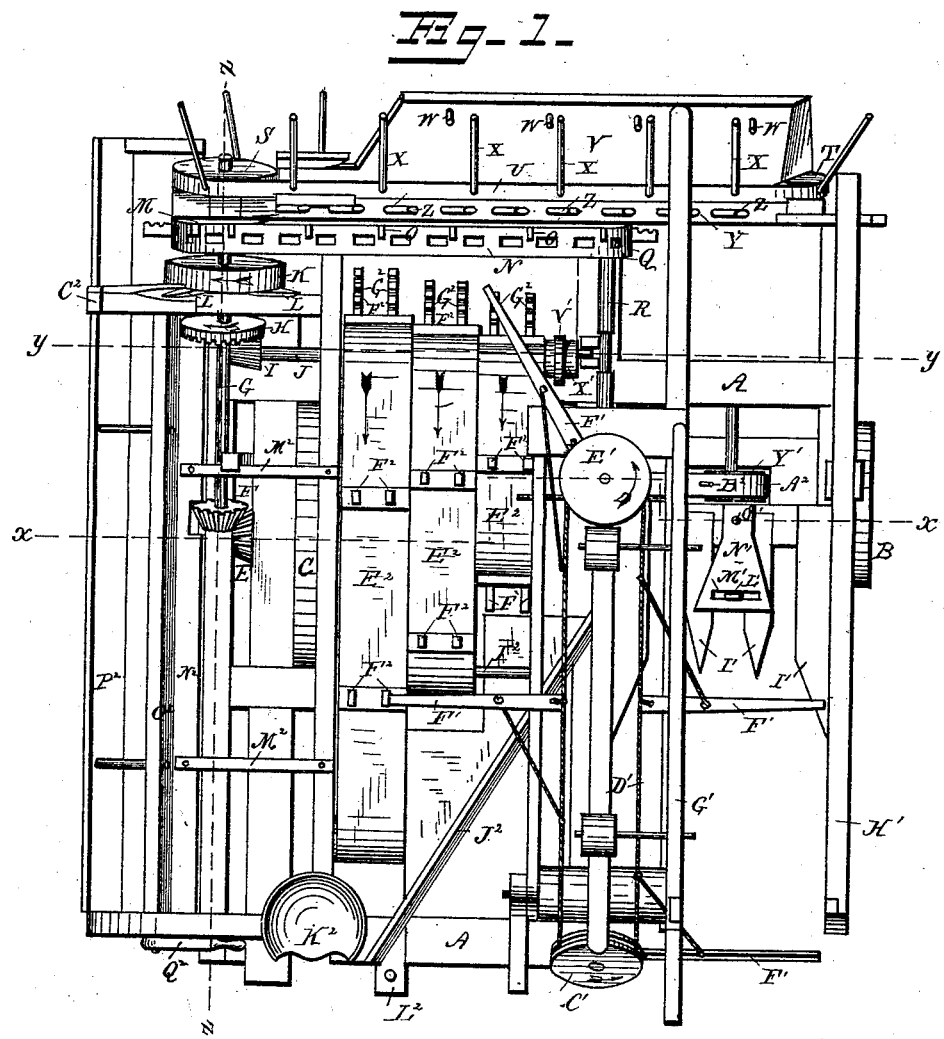
Figure 2:
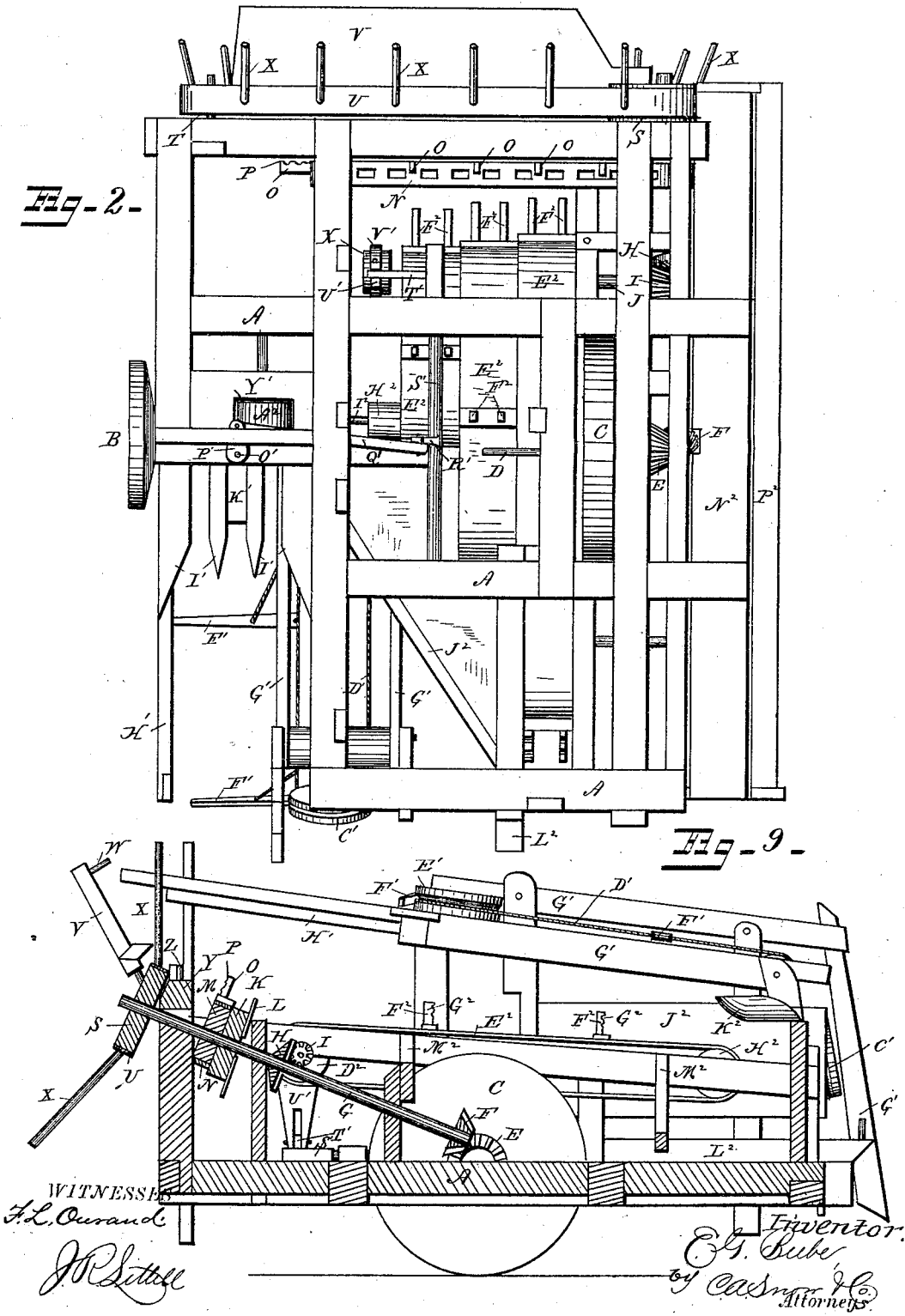
Figure 3:
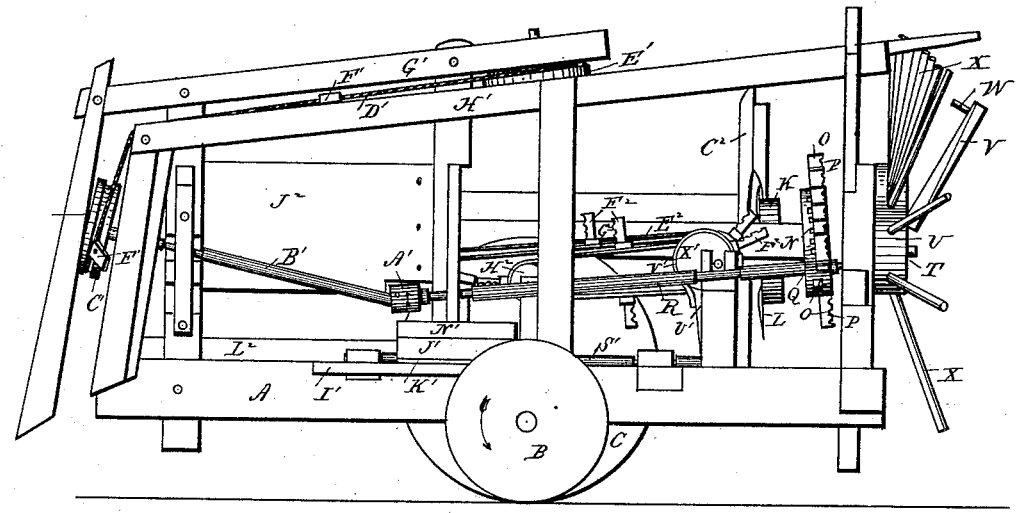
Figure 4:
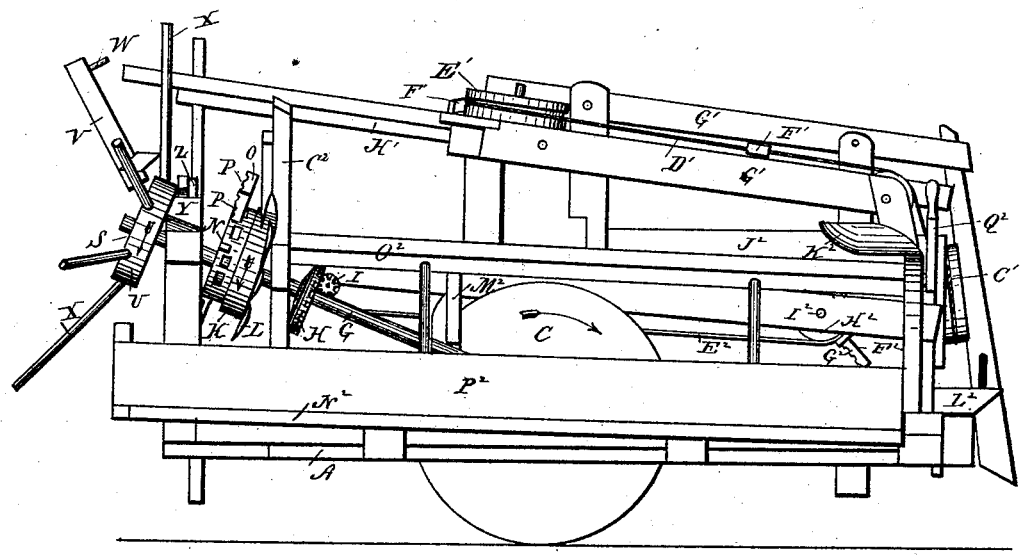
Figure 5:
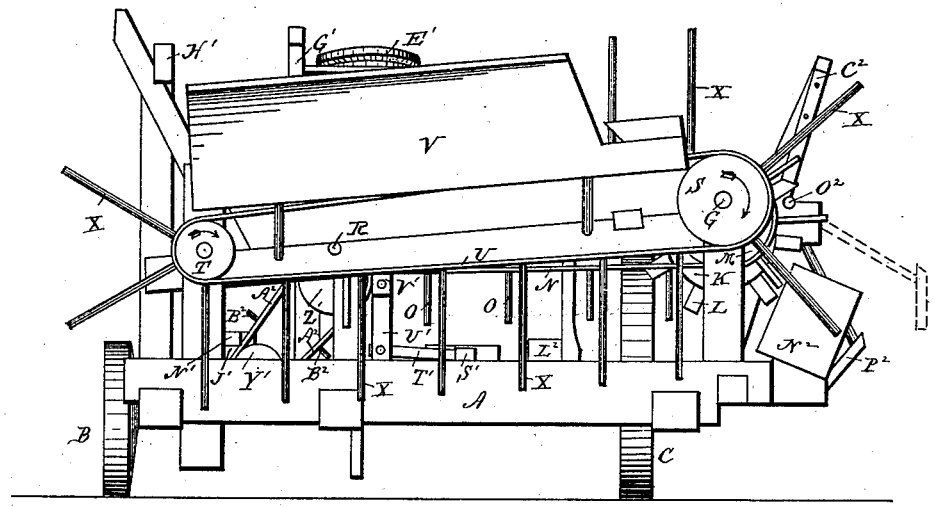
Figure 6:
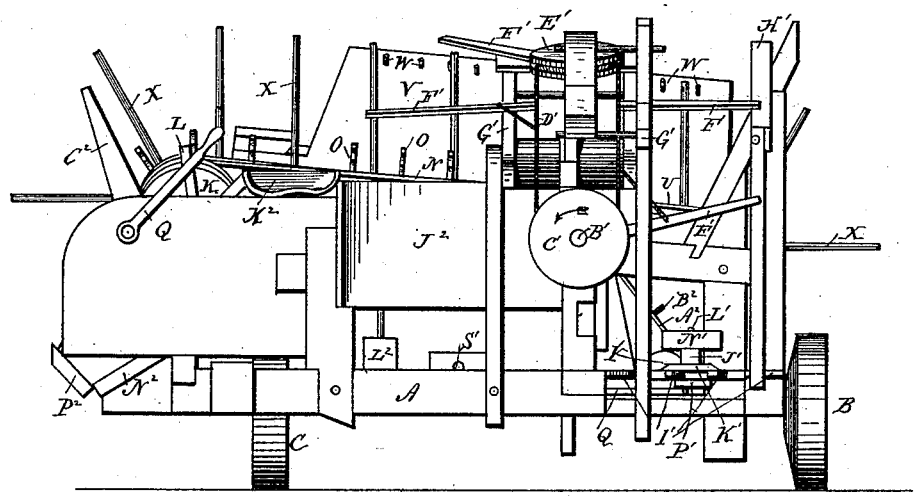
Figure 7:
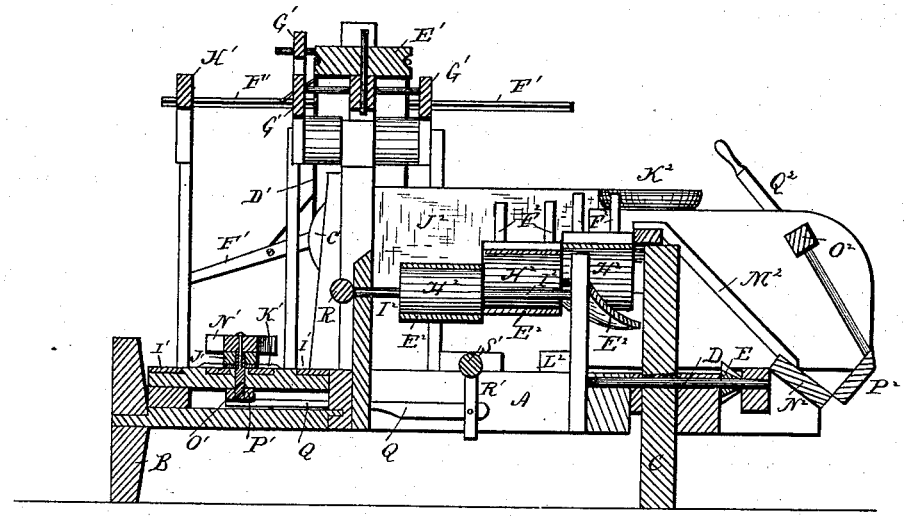
Figure 8:
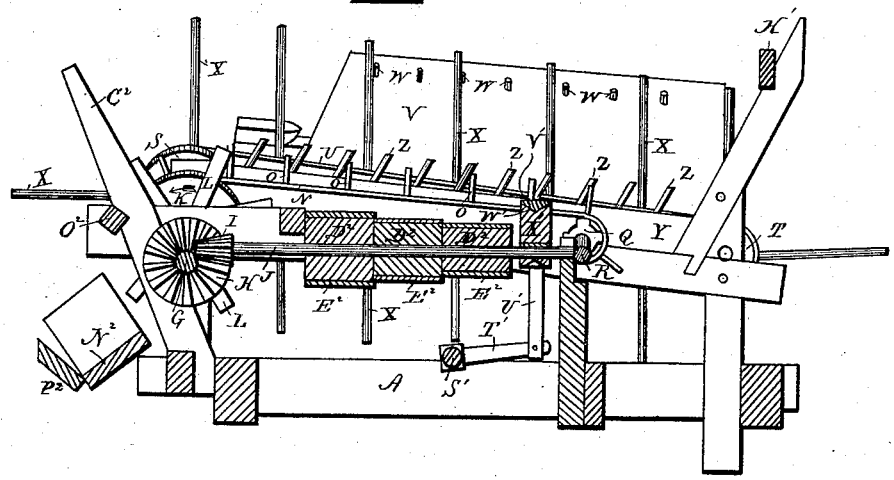

In the drawings, Figure 1 is a top view of the complete machine. Fig. 2 is a bottom view thereof. Fig. 3 is a side view. Fig. 4 is a side view from the opposite side. Fig. 5 is a rear end view. Fig. 6 is a front end view. Fig. 7 is a vertical transverse sectional view on the line $x\ x$, Fig. 1. Fig. 8 is a like view on the line $y\ y$, Fig. 1. Fig. 9 is a section on the line $z\ z$, Fig. 1.

Referring to the drawings, A designates the frame, which carries a supporting-wheel, B, and main drive-wheel C, the shaft D of the latter being provided with a bevel-gear wheel, E, meshing with a corresponding wheel, F, on a shaft, G. The latter carries a bevel-gear wheel, H, meshing with a pinion, I, on a transverse shaft, J, and is also provided with a disk, K, having radial cutters L. Shaft G is further provided with a band-wheel, M, carrying a belt, N, which belt is provided with pins O, having a serrated edge, P, and works around a band-wheel, Q, on a forwardly-extending shaft, R.

S is another band-wheel, arranged on the end of shaft G, and carries, with a band-wheel, T, a belt, U. Belt U works around an inclined table or platform, V, having pins W, and said band U is provided with long arms X, as shown.

Between belts N and U is arranged a beam, Y, having inclined pins Z.

Forward shaft, R, is provided at its front end with a socket, $A'$, in which is pivoted an upwardly-inclined shaft, $B'$, carrying at its front end a pulley, $C'$. Around the latter passes a chain or cord, $D'$, which extends upwardly and rearwardly and around another pulley, $E'$. Cord or belt $D'$ carries lateral reel-arms $F'$, which work between guides $G'$, and extend across to a guide-frame, $H'$, at the side of the machine.

Under guides $G'$ and $H'$ are arranged fingers $I'$, over which oscillates a block, $J'$, carrying cutting-blades $K'$. Block $J'$ has a pin, $L'$, which passes up through a slot, $M'$, in a pivoted swinging block, $N'$.

Block $J'$ is oscillated by means of the following mechanism: To its pivot $O'$ is fixed an arm, $P'$, to which is pivoted a longer arm, $Q'$, pivoted at its inner end to a dependent arm, $R'$, on a rock-shaft, $S'$. At its rear end rock-shaft $S'$ has a fixed arm, $T'$, which is pivoted to a depending strip or block, $U'$, having a band, $V'$, passing over a groove, $W'$, in an eccentric, $X'$, fixed on shaft J. Thus, as the eccentric revolves, the block $U'$ is alternately raised and lowered to operate the rock-shaft, which in turn oscillates cutting-block $J'$.

Just in rear of the cutting mechanism $J'$ is journaled a pulley, $Y'$, which, with a pulley, $Z'$, on shaft R, carries an elevating-belt, $A^2$, having pins $B^2$.

Cutters L on disk K operate in conjunction with a cutting-standard, $C^2$, and shaft J is provided with a series of fixed pulleys, $D^2$, around which work belts or conveyers $E^2$, having pins $F^2$, with serrated edges $G^2$. Belts $E^2$ are longitudinally arranged, and also work over pulleys $H^2$ on shafts $I^2$.

At the front of the machine, and at an angle to belts $E^2$, is a vertical board or guide, $J^2$, at the side of which is arranged the driver's seat $K^2$, and in front the bar $L^2$.

At right angles to belts $E^2$ are arranged inclined guides $M^2$, leading to a longitudinal inclined platform, $N^2$, over which is a rock-shaft, $O^2$, carrying a board, $P^2$, which, in connection with platform $N^2$, forms a V-shaped box. When the rock-shaft $O^2$ is operated by means of a handle, $Q^2$, at the driver's seat, the board $P^2$ is elevated and the contents of the box deposited on the ground.

The operation and advantages of my invention will be readily understood. As the machine moves forward, motion is transmitted by the drive-wheel C through the shafts, gear-wheels, and pulleys to drive the belts, feeders, and cutters. The machine is adapted to cut one row of cane at a time, and after it is put in motion the arms F', moving backward, raise any leaning stalks and crowd all over onto the fingers I', where they are cut near the ground by cutters K' on block J'. As fast as it is cut, the heads of the cane fall over against inclined platform V, the longer stalks of the cane falling with the heads high up the platform, while the heads of the shorter stalks will be lower down the platform. The swinging block N' crowds the butt-ends of the stalks onto the machine, and when the heads fall on platform V the butt-ends are carried by belt $A^2$ up onto the forwardly-moving belts $E^2$. The heads are struck by the arms X and bind against pins W, which, as the stalks are carried toward the side of the machine, scrape off the seed or leaves. The fingers or pins $F^2$ of belts $E^2$ pass down the body of the stalks and cause the butt-ends to move along with the heads sidewise. Fingers $F^2$ also strip off any leaves or blades on the stalk and keep the butt-ends of the stalks worked up against angle-board $J^2$, which gradually admits of the whole stalk slipping forward until the heads slide down platform V to the fingers O of belt N. The stalks are now prevented from further slipping by the heads being bent around notched or serrated fingers O by reason of being crowded against stationary pins Z. The cane is thus held on fingers O until the heads reach the rotary cutting-disk K, when they are cut off and fall into the V-shaped box on one side disk K, while the headless stalks pass over guides $M^2$ into the box. Now, by lifting board $P^2$, the stalks and heads are deposited in separate piles on the ground.

My invention is simple and effective in operation.

I claim as new—

1. The combination, with the forwardly-moving belts $E^2$, having fingers $F^2$, of the laterally-moving belt N, having fingers O, with notched edges P, laterally-moving belt U, having long fingers X, and intermediate stationary beam, Y, having inclined fingers Z, as set forth.

2. The combination of forwardly-moving belts $E^2$, having fingers $F^2$, vertical angle-board $J^2$, laterally-moving belt N, with serrated fingers O, intermediate stationary beam, Y, with inclined fingers Z, laterally-moving belt U, with long fingers X, inclined platform V, having pins W, rotary cutting-disk K at the side of belt N, and cutting-standard $C^2$, as set forth.

3. The combination of the forwardly-moving belts $E^2$, having fingers $F^2$, laterally-moving elevator-belt $A^2$, having pins $B^2$, angle-board $J^2$, fingers I', cutting-block J', oscillated by cam mechanism, and having pin L' and slotted and pivoted block N', as set forth.

4. The combination of guide-frame H', guides G', belt D', carrying lateral arms F', fingers I', having oscillating cutting-block J', elevator $A^2$, longitudinally and forwardly moving belts $E^2$, angle-board $J^2$, inclined rear platform, V, belts N and U, moving laterally and having pins and stationary central or intermediate beam, Y, having pins Z, as set forth.

In testimony that I claim the foregoing as my own I have hereto affixed my signature in presence of two witnesses.

EDGAR GEORGE BEEBE.

Witnesses:
H. J. GALLAGHER,
E. C. KING.